Sept. 19, 1944.  F. E. SMITH  2,358,743
FLEXIBLE HOSE
Filed Aug. 18, 1943
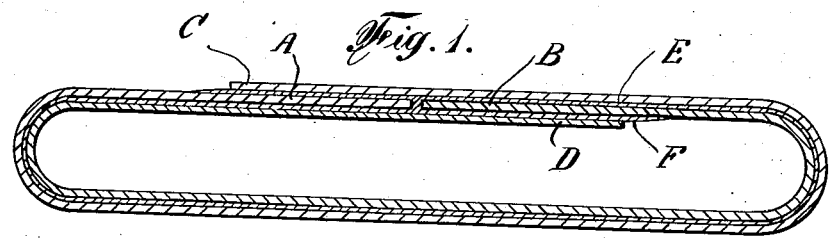
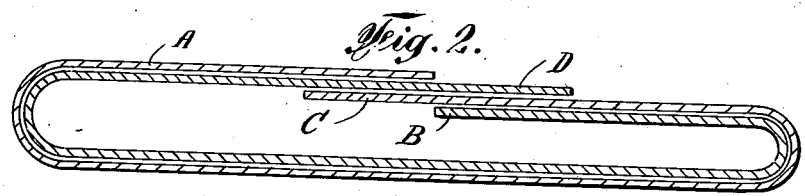
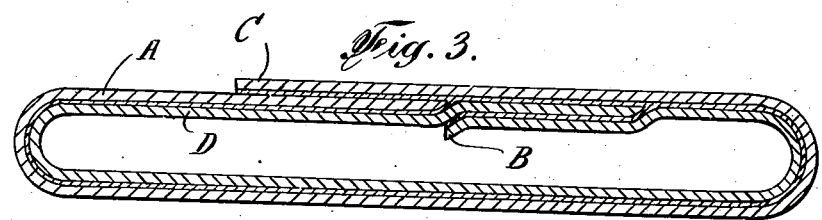
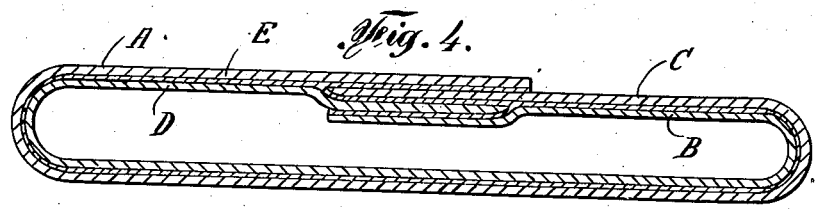
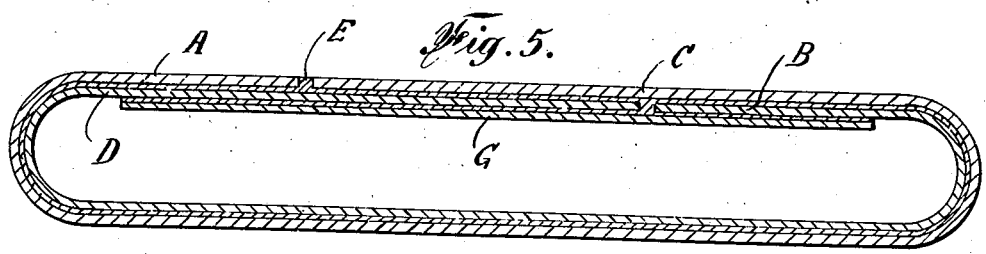
INVENTOR.
Franklin Elijah Smith
BY
Haseltine, Lake & Co.
ATTORNEYS

UNITED STATES PATENT OFFICE 2,358,743

FLEXIBLE HOSE

Franklin Elijah Smith, Chelsfield, England

Application August 18, 1943, Serial No. 499,060
In Great Britain April 16, 1941

5 Claims. (Cl. 138—53)

This invention relates to flexible hose for the passage of water and other liquids. This application constitutes a continuation-in-part of my application Serial No. 441,152 filed April 30, 1942. In my said application I have disclosed a method of making flexible hose by assembling strips of fabric coated with adhesive on one or both sides, in flat form in suitable overlapping relation and preferably with an insulating sheet of rubber or the like between each ply, press curing the assembly in such flat or slab form, applying a jointing solution to the ends of the plies, bending the assembly to unite the ends in a longitudinally lapped joint with the ends of the plies in interlapped relation and press curing the hose thus formed, thereby forming a substantially flat-sided hose.

The present invention relates to multiply hose formed preferably by the method referred to and has for its principal object to provide such hose which shall be substantially flat when not in use to facilitate reeling, and in which either in such unused deflated condition or when subjected to high fluid pressures in use there will be no tendency for the joints to open or for separation of the plies along any part of the hose wall to occur.

In the accompanying drawing I have illustrated several forms of my invention by way of example.

Figures 1–5 show in cross-section a two-ply hose with the ends of the plies in different interlapped relation to form longitudinal lapped joints.

In carrying out this invention strips or widths of woven material, such as jute, flax, cotton, ramie, hemp or any other textile fibre, two or more plies are coated with rubber on the inner surface or outer surface, or both, by any orthodox or known method, made into a slab, press cured in slab form in known manner, and made into hose with a longitudinal lapped joint. The joints or seams may be supplemented with a suitable jointing solution, and again press cured to make a secure joint. Preferably an insulating sheet of rubber or the like, to prevent percolation, is placed between each ply and the adjacent ply or plies. Alternatively friction coated or spreader coated surfaces of the plies having insulating rubber sheet or layer laid between them are placed face to face, made into hose, and then press cured in one curing operation. Thus there may be one or two curing operations, and in the latter case the flat strip sheet or slab may be press cured in slab form, then the seam or lap made, and the hose and joint or seam press cured again with any appropriate jointing solution. The joint may be made with air curing solution.

In the case of two-ply or three-ply fabrics one or both surfaces of each ply is or are coated by the known friction coating or spreading method, and press cured in slab form in known manner. In the case of a two-ply fabric there is a rubber sheet or insulating layer incorporated between the plies, or if three-ply, then a rubber insulating sheet or layer is incorporated between each pair of adjacent plies.

In the case of a two-ply hose, the slab may be formed in any of the ways illustrated in the accompanying drawing, Figures 1 to 5. It will be understood that the jointing method illustrated can be applied to hose of any ordinary diameter.

Referring to Figure 1, after coating each ply with rubber, the two plies are superposed in staggered arrangement so as to leave an overlapping edge on each ply, C indicating the overlapping edge on one ply, and D the overlapping edge on the other ply. The superposed plies are then press cured. The edges are then brought together as shown, so that the overlapping edge C lies over the other edge A of the same ply, which may be termed the outer ply, and the overlapping edge D overlaps the edge B of the same (inner) ply, the two edges A and B abutting against each other within the overlapping part C, D. The joining or seam thus made is consolidated by pressure and heat. It will be understood that A and C represent the opposite edges of one ply, say the outer ply, whilst B and D represent the opposite edges of another ply, say the inner ply. Thin layers of rubber E, F, may be interposed between the laps.

Alternatively, as shown in Figure 2, the edge portions C and D, which overlap each other, lie between the edge portions A, B. In another example as shown in Figure 3, the narrow part A and wide part D enter between the parts B and C. In another alternative, Figure 4, the two edges are substantially in alignment instead of being staggered, forming a lapped joint or seam with one ply at each side entering between the two edges of the other side. In the modification shown in Figure 5 the wider edges C, D, overlap each other. A jointing strip G assists in rendering the joint secure.

The folds are made by hand or by known machinery, and the hose may then be pressed in a flat or doubled condition between upper and lower pressing plates. Preferably, however, a spacing piece of hard material, for example, metal, of the same length as the hose section being made, but of less width than the folded hose, that is, slightly wider than the overlap, is placed inside the hose before pressing, in order to prevent pressure being exerted on the parts remote from the joints or seams at each side.

In all forms of construction there may be an internal rubber lining in the hose. It will be understood that instead of rubber, synthetic rubber or a Celluloid derivative may be used, or a thin sheet or layer of a suitable waterproofed fabric, for example, an open woven mesh fabric known as breaker cloth, with the interstices filled in with rubber, or with synthetic rubber, by a known friction or spreader method. Alternatively, a light weight closely woven fabric may be used for the insulating lining between the layers of heavier cloth which give strength to the hose.

What I claim is:

1. A two-ply tubular hose having two of its sides substantially flat and a longitudinal lap joint formed by the edges of the plies being interlapped and united so that one edge of one ply overlies the other edge of the same ply and both edges of the other ply.

2. A two-ply tubular hose having two of its sides substantially flat and a longitudinal lap joint along one of the flat sides said joint being formed by the edges of the plies being interlapped and united with one edge of the first ply and one edge of the second ply arranged in abutting relation the other edge of the first ply overlying and the other edge of the second ply underlying the said abutting edges.

3. A two-ply tubular hose as claimed in claim 1 wherein the edges of one ply overlap each other and are both arranged between the edges of the other ply.

4. A two-ply tubular hose as claimed in claim 1 wherein one edge of the first ply overlaps the other edge of the same ply and both edges of said first ply overlie both edges of the second ply.

5. A multi-ply tubular hose as claimed in claim 1 having an insulating sheet between each ply with the edges of said insulating sheet interlapped with the edges of the said plies.

FRANKLIN ELIJAH SMITH.